(12) United States Patent
Yawney et al.

(10) Patent No.: US 7,159,358 B2
(45) Date of Patent: Jan. 9, 2007

(54) MOBILE, INDOOR, SIT-AND-PLANT GARDENING STATION

(76) Inventors: Stacey Yawney, 1376 Stokes Rd., Medford, NJ (US) 08055; James E. Yawney, 1376 Stokes Rd., Medford, NJ (US) 08055

( * ) Notice: Subject to any disclaimer, the term of this patent is extended or adjusted under 35 U.S.C. 154(b) by 689 days.

(21) Appl. No.: 10/315,817

(22) Filed: Dec. 9, 2002

(65) Prior Publication Data
US 2003/0084610 A1 May 8, 2003

Related U.S. Application Data

(63) Continuation-in-part of application No. 09/818,034, filed on Mar. 27, 2001, now abandoned.

(60) Provisional application No. 60/192,595, filed on Mar. 27, 2000.

(51) Int. Cl.
*A01G 9/00* (2006.01)
(52) U.S. Cl. ............................................ 47/65.5; 34/14
(58) Field of Classification Search ................. 47/65.5, 47/17, 18; 34/14, 17, 27; 280/47.26, 47.34, 280/14.28; *A01G 9/00*
See application file for complete search history.

(56) References Cited

U.S. PATENT DOCUMENTS

| 4,373,761 | A | * | 2/1983 | Hansberry, Jr. | ........ 312/249.12 |
| 4,739,580 | A | * | 4/1988 | Simmons et al. | .............. 47/17 |
| 5,318,315 | A | * | 6/1994 | White et al. | ............. 280/47.26 |
| 5,448,853 | A | * | 9/1995 | Harman | ......................... 47/60 |
| 5,887,878 | A | * | 3/1999 | Tisbo et al. | .............. 280/47.19 |
| 5,927,745 | A | * | 7/1999 | Cunningham | ............... 280/652 |
| 6,622,425 | B1 | * | 9/2003 | Shepherd | ....................... 47/17 |

FOREIGN PATENT DOCUMENTS

| GB | 2137464 A | * | 10/1984 |
| JP | 2002034345 A | * | 2/2002 |

* cited by examiner

*Primary Examiner*—Teri Pham Luu
*Assistant Examiner*—Susan C. Alimenti
(74) *Attorney, Agent, or Firm*—Donald C. Simpson, Esq.

(57) ABSTRACT

A mobile, indoor, sit-and-plant gardening station that provides individuals with the year round opportunity to enjoy their love of plants and gardening well into their later years in life and enables them to garden sitting down.

5 Claims, 5 Drawing Sheets

MOBILE, INDOOR, SIT-AND-PLANT GARDENING STATION

Applicant hereby claims the benefit of patent application Ser. No. 09/818,034, filed Mar. 27, 2001, now abandoned of which the present application is a continuation-in-part, and which in turn claims the benefit of Provisional Patent Application No. 60/192,595 filed Mar. 27, 2000, incorporated herein by reference.

BACKGROUND OF THE INVENTION

While gardening has always been a popular and relaxing pastime, there are many people who are unable to work with plants because of age or disability or inclement weather or uncomfortable weather conditions. In general, such persons are generally restricted to "gardening" in small flower pots that take up space on tables, window sills, and the various flat surfaces in their places of residence and/or to outdoor "table gardening" when weather and climactic conditions permit. It would be advantageous to such persons if they could garden year round irrespective of age, disabilities, or outdoor conditions. People always love flowers and this would give individuals an outlet to ease the stress of everyday life and, at the same time, decorate their home or office with their favorite flowers and plants year round. It is a primary object of the present invention to provide such a product that is easily accessed by the individual and which can be easily moved about inside a place of residence, including from room to room or even to the outside when weather permits.

BRIEF SUMMARY OF THE INVENTION

The primary object of the present invention is achieved through the development of a mobile, indoor, sit-and-plant gardening station that provides individuals with the year round opportunity to enjoy their love of plants and gardening well into their later years in life and enables them to garden sitting down. The product resembles a carriage with wheels, enabling the individual to sit in a chair and have a work area at the side of the planting bed as if they were sitting at their kitchen table. The invention, referred to hereinafter as "Sit & Plant" may be thought of as a planter on wheels that can be moved to any location in a home or office. During the summer it can be transported out onto a deck and during the winter it can be rolled into the house. A light attachment with grow lights permits the growing of plants indoors at any time including the winter months.

DETAILED DESCRIPTION OF THE INVENTION

Sit & Plant is a portable, raised planting bed that allows an individual to perform gardening activities while in a seated or upright position. Because the individual does not have to kneel, bend, stoop, etc., Sit & Plant alleviates much of the physical strain and exertion generally associated with gardening. This is especially beneficial for older and physically limited and/or handicapped gardeners, although not limited to any group because Sit & Plant is intended to help alleviate stress in the lives of those individuals who use Sit & Plant. Sit & Plant allows gardeners year-round, indoor-outdoor access to a planting area for the creation of a beautiful garden.

Figure 1:
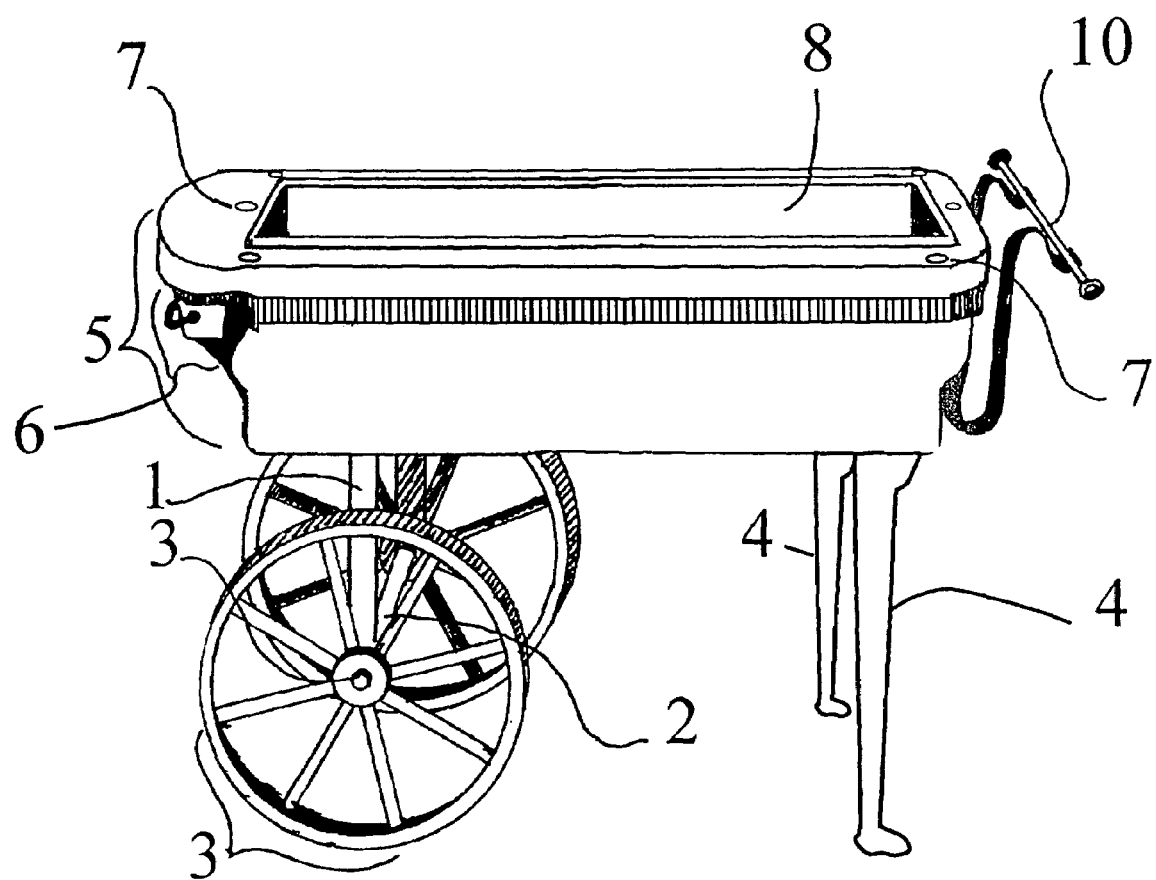
FIG. 1 is a side view of the mobile, raised bed gardening station of the present invention.
Figure 2:
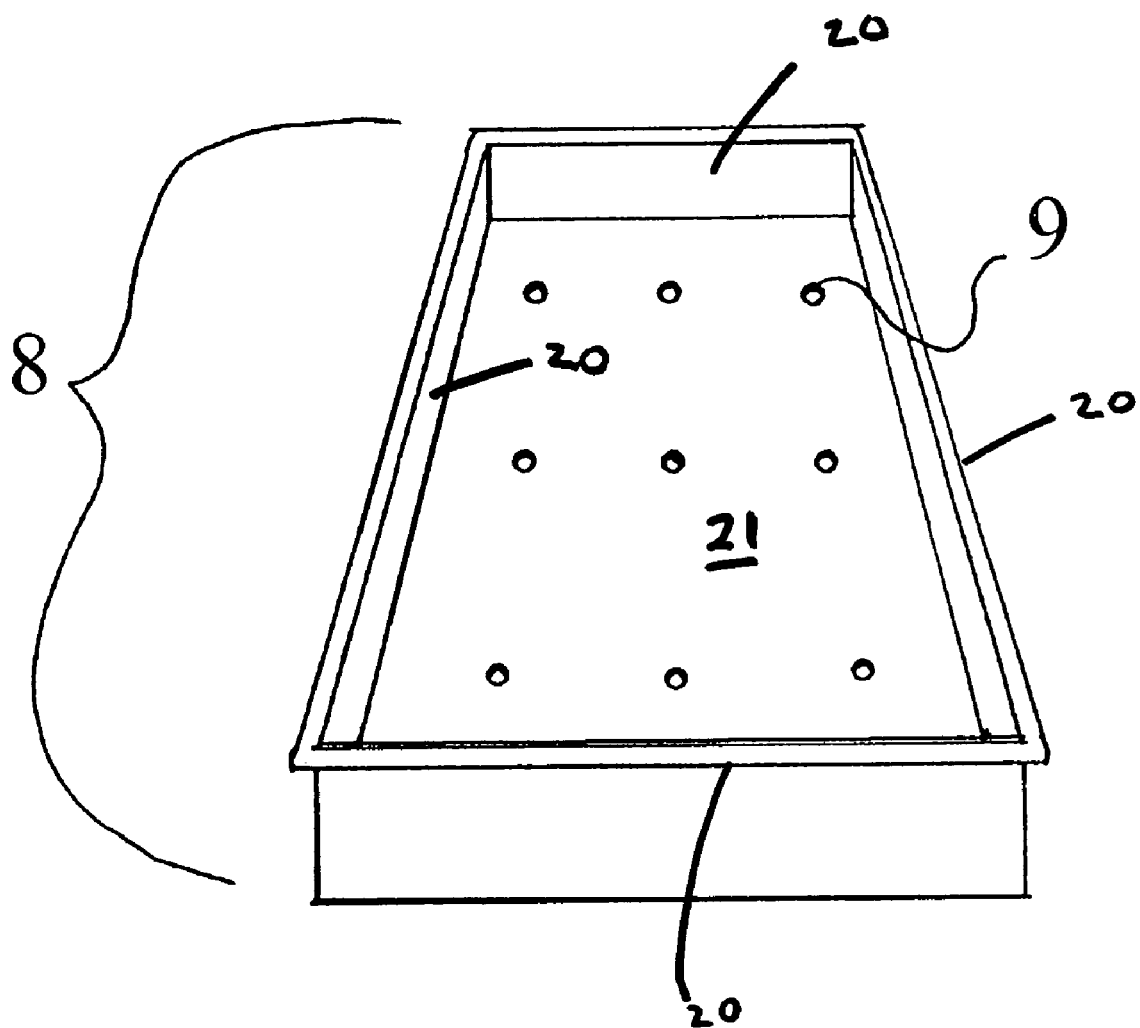
FIG. 2 is an insert for use with the raised bed planter shown in FIG. 1.

As shown in FIGS. 1 and 2, the invention comprises a frame 1 defining a support structure having an attached axle 2 with wheels 3, attached legs 4, and shell 5. Axle 2 and wheels 3 are normally positioned at the front end of the Sit & Plant and are preferably provided with ball bearings to insure smooth and easy movement. Legs 4 are positioned in the normally rear position and are connected to the frame and/or the shell. The legs can be fitted with castors to make it easier to move the Sit & Plant short distances. Shell 5 defines the exterior of the planting bed and is attached to frame 1.

Optionally, sliding drawers 6 may be built into the shell for the convenience of the user; these may be carried on tracks that slide into the shell. Grow light receptacles 7 can be attached to the shell to provide necessary light to the Sit & Plant. In most instances, some type of grow light will be necessary for successful use of the Sit & Plant unless a very good source of light is available in the user's place of residence.

Insert 8 is an essential element of the Sit & Plant. The removable insert fits into the interior of shell 5. The insert, normally made out of plastic, can be made in several variations depending upon the needs or wishes of the customer. For example, one insert may provide a tiered planting bed to achieve a tiered effect with plants. Similarly, the depth of the various inserts may accommodate flowers or herbs, houseplants, et cetera, depending on the particular rooting characteristics of the chosen plants.

Figure 4:
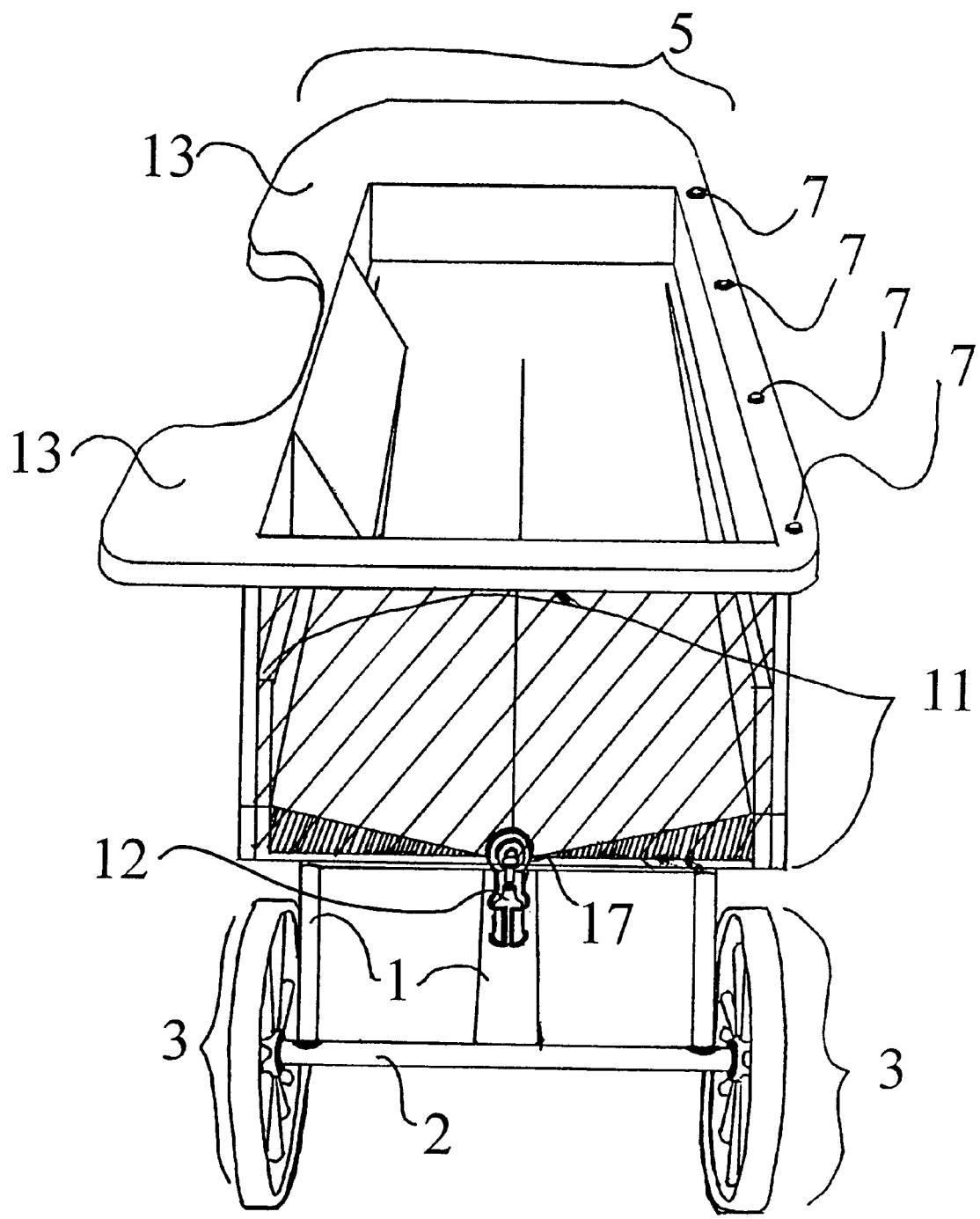
FIG. 4 is a frontal view of the invention.

A good drainage system is essential and is built into shell 5. Insert 8 is provided with drainage holes 9 to drain excess water from insert 8 into shell 5. As is shown in FIG. 4, the drainage system 11 built into shell 5 includes a gently sloping bottom directing water to a spigot attachment 17 which can be opened to drain excess water out of shell 5 and into container 12 for storage and ultimate removal. As is shown in FIG. 2 and FIG. 5, insert 8 is provided with drain holes 9 which allow water to drain from the contained plants into shell 5 where it can ultimately be removed as described.

As shown in the drawings, shell insert 8 is essentially an open-topped box comprising enclosing side walls 20 and a base or bottom 21. Insert 8 is essentially a liner for shell 5 and the side walls 20 of shell liner insert 8 are of a size and configuration to conform generally to the inner walls of shell 5. It is unnecessary for the shell liner insert 8 to conform in depth to shell 5 and it is preferred that when shell liner insert 8 is placed in shell 5, that there is a small amount of free space under the bottom 9 of shell liner insert 8 so that water can drain easily from shell liner insert 8 into the interior of shell 5 and, when desired, be drained therefrom.

The Sit & Plant can be moved to any location chosen by the user simply by pushing or pulling it. For this purpose, handle bar 10 is provided at the rear and connected to either shell or frame. A second handle may be provided at the front end as well if desired.

Figure 3:
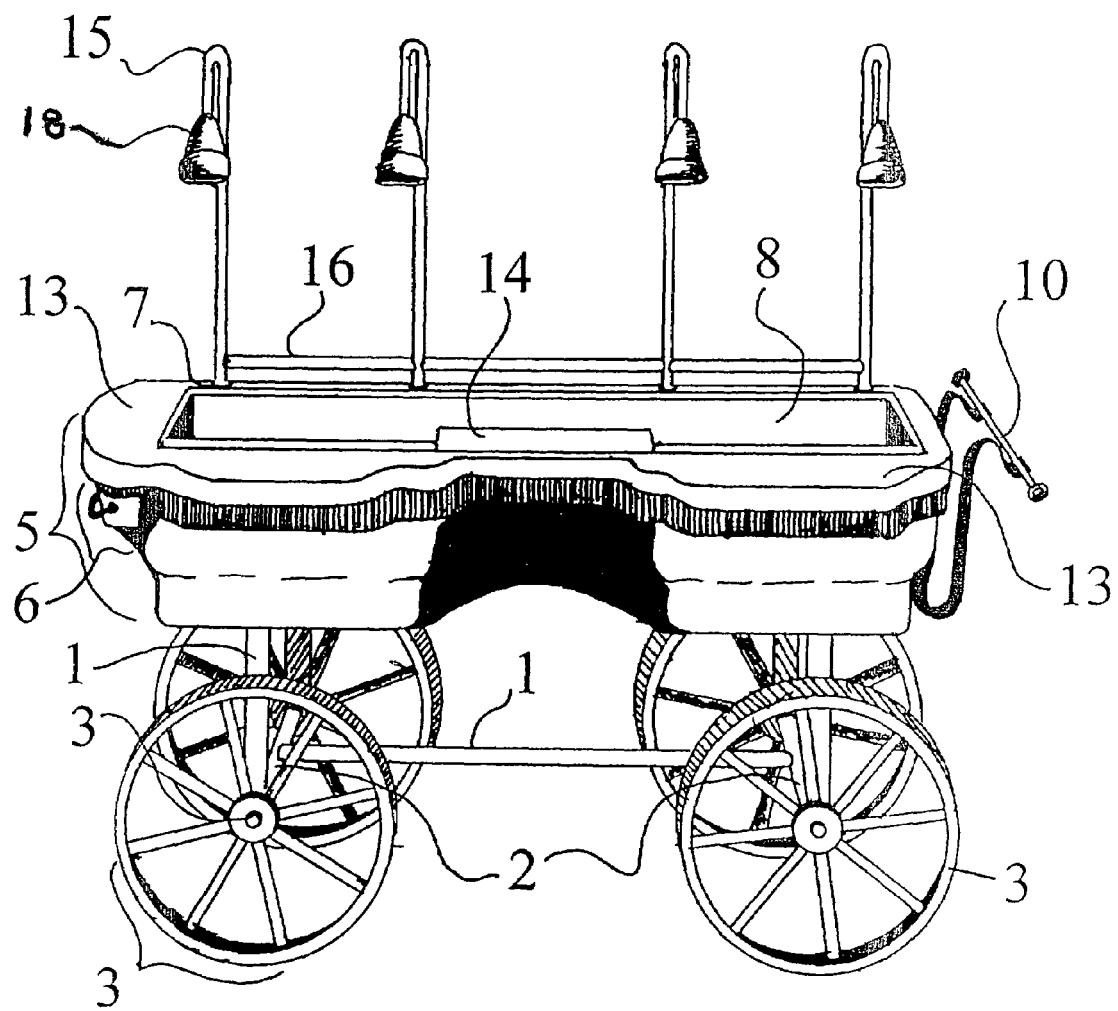
FIG. 3 is a side view of a second embodiment of the mobile, raised-bed gardening station of the present invention.
Figure 5:
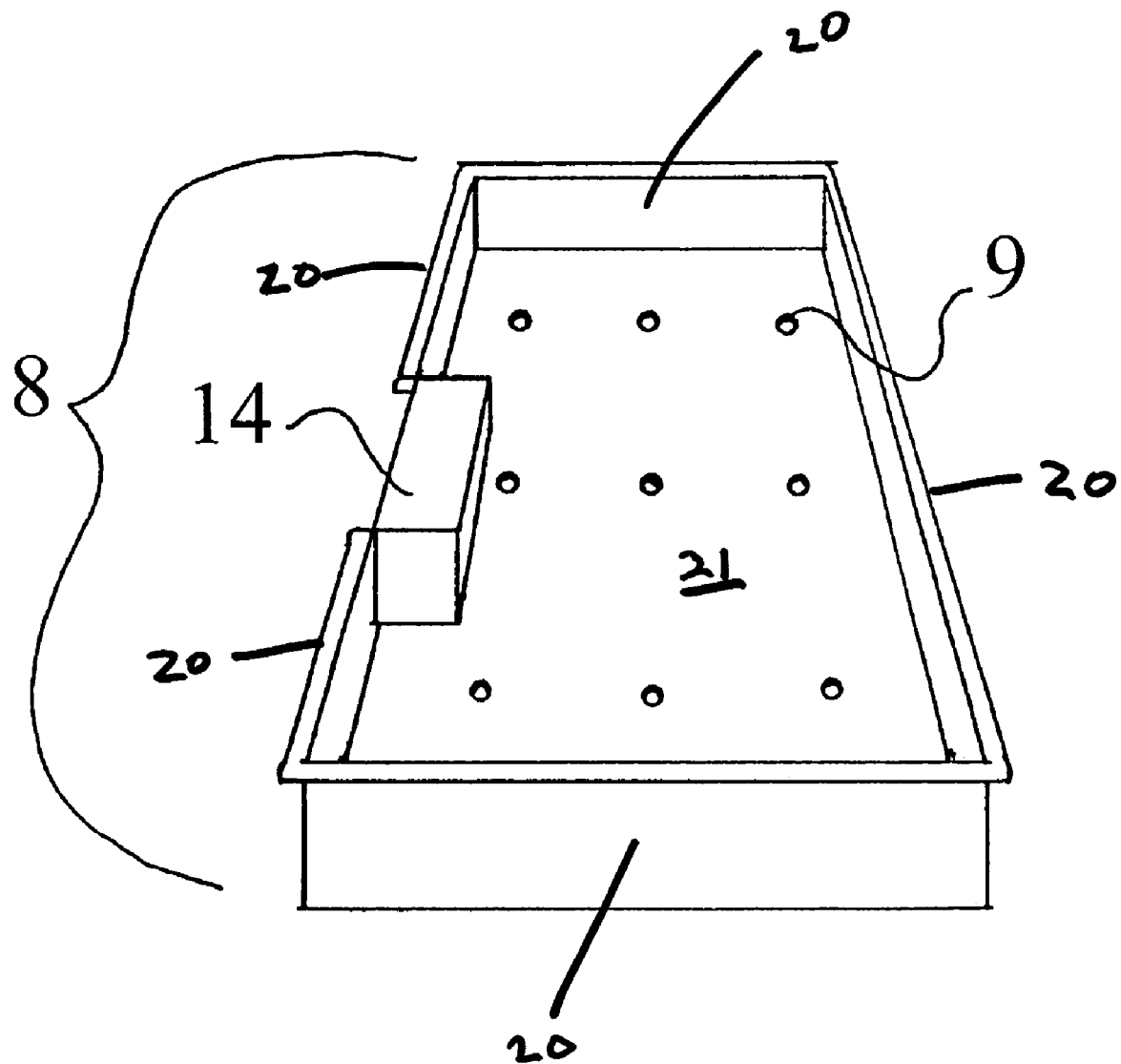
FIG. 5 is an insert for use with the raised-bed planter shown in FIGS. 3 and 4.

A more detailed version of the Sit & Plant is shown in FIGS. 3–5. This modification is similar to the foregoing version as will be seen by referring to the Figures and comparing the following parts:

Frame 1—support structure that is connected to axles 2 and to shell 5;

Axles 2—two axles are connected to frame, and each axle is connected to two wheels and legs 4 are omitted;

Wheels 3—four wheels each having ball bearings and connected to axles 2. Wheel locks (not shown) are preferably attached to the wheels;

Shell 5—forms exterior of planting bed and is attached to the frame;

Drainage system 11—built into the bottom of the shell as part of the shell. Has a spigot attachment to drain excess water, and is built-in as part of the shell.

Work surface area 13—surface area of the fixed structure of the shell or to be affixed to the shell;

Insert 8—fit into the interior of the shell and removable;

Handle bar 10—located at front ( and rear, if desired) of planter and connected to either shell or frame.

Drainage holes 9—located on bottom of insert(s) 8;

Sliding drawer(s) 6—built into the shell with tracks that slide into the shell;

Secondary work surface area 14—built-in part of insert(s) to provide a continuation of work surface which is part of the shell;

Grow light receptacle 7—attached to the shell to allow the grow light system to be inserted into Sit & Plant;

Water collection bottle 12—attached to the shell or frame. Located directly under the spigot on the exterior of the shell. Water collection bottle can be removed.

Grow lights 15—typically a single unit that connects to grow light bases located on surface of shell;

Support and connector bar 16—connects grow lights, attached to each stem of grow lights;

Spigot attachment is built into shell;

Light FIG. 18—located and attached to top of stem.

The dimensions of Sit & Plant range from about 36–44 inches in length ×22–32 inches in width ×30–34 inches in height. The key is to insure that the Sit & Plant is able to pass through standard size doorways. The wheels are approximately 8 to 18 inches in diameter. The depth of the insert may be about 6 to 14 inches.

Sit & Plant rests on a base that includes two (2) or more wheels or two (2) front wheels and two (2) rear legs, which allow Sit & Plant to be transported to various locations indoors or outdoors. One embodiment includes one castor attached to the base of each leg. As noted, in the preferred embodiment, the wheels include a wheel lock system to prevent movement once placed in the desired location.

Insert is used for the purpose of holding dirt, plants, potted plants, etc., and fits inside the hollowed inner area of the shell. Inserts are removed independently of the shell for the purposes of replanting, cleaning, maintaining, etc., the planting area. This further provides ease and accessibility of Sit & Plant. Additionally, inserts can have handles or some similar feature to ease the process of lighting and lowering the inserts in and out of the shell.

Various styles and models of inserts are offered for the purpose of creating different soil depths, allowing a greater variety of plants to be grown, and various modes of accessibility. The preferred insert embodiment is a rectangular-shaped insert with drainage holes that work in conjunction with the drainage system located in the shell. A secondary insert embodiment includes one or more cylinder-shaped inserts (similar to a barrel cut in half) mounted on ball bearings. Ball bearings are attached to an insert similar to the preferred insert embodiment. The ball bearings allow the cylindrical inserts to rotate in a circular motion. The cylindrical inserts include drainage holes. The plants within the cylindrical inserts can be rotated to within reaching distance of an individual, and allow the individual to work and tend to their plants from a sitting position. Still another insert embodiment is a grid structure that fits atop the preferred insert embodiment. This grid supports pots that include a lip around the top perimeter of the pot. The lip of the pot rests atop and is suspended by the grid while the remaining area of the pot rests below the grid within the area of the preferred insert embodiment. These pots include drainage holes. The benefit of the grid is that it provides an individual the opportunity to easily interchange the pots at varying points on the grid. Furthermore, these pots can each be removed independently and transported.

Another embodiment includes a motorized method of propulsion. This mobility enables Sit & Plant to be transported to areas of optimum natural sunlight. Sit & Plant can include a method to adjust the height of the shell either manually or by motorized method for the purpose of accommodating the accessibility needs of individual users of Sit & Plant.

Sit & Plant can have various features and attachments for the purpose of creating a controlled growth environment to foster the year round growth of plants. Grow lights are one such attachment, connecting on the surface of the shell to specific receptacles that accept the grow lights. These grow lights plug into an electrical outlet. The amount of light is adjustable, and the stem of the grow lights is adjustable for the purpose of raising and lowering the height of the grow lights based on the needs of individual plants or plant groups. Sit & Plant can also include a clear bubble-like dome for such purposes as creating a mini-greenhouse effect, so the humidity and temperature are controlled within the mobile garden when placed over the planting bed area and resting atop the shell.

Sit & Plant is a mobile, raised planting bed that allows an individual to perform gardening activities while in a seated or upright position. Sit & Plant resembles a desk-like structure with built-in and/or attachable work surfaces adjacent to a raised planting bed where plants of any varieties are grown. Because the individual does not have to kneel, bend, stoop, etc., Sit & Plant alleviates much of the physical strain and exertion generally associated with gardening. This is especially beneficial for older and physically limited and/or handicapped gardeners, although not limited to any group because Sit & Plant is intended to help alleviate stress in the lives of those who use Sit & Plant. Sit & Plant allows gardeners year round, indoor-outdoor access to a planting area for the creation fo a beautiful garden.

Since the Sit and Plant is designed to be mobile, and be able to be moved throughout most of the living quarters of the ordinary residence, it should be dimensioned accordingly so that it is capable of being moved through the ordinary doorways found in residences. Typically, the dimension for Sit & Plant are suitably 44 inches in length, 32 inches in width, and 34 inches in height. The wheels are suitably 18 inches in diameter and extend no more than about 6 inches beyond the front and rear of the planting bed. Typically, the handlebars extend any suitable distance beyond the 44 inch length of the Sit and Plant. The depth of the shell liner insert 8 can be suitably between 6 and 14 inches; any less than 6 inches provides inadequate soil for roots, and any deeper than 14 inches increases the weight of the soil-filled shell liner insert 8 beyond what can be reasonably and easily lifted and moved.

In summary, therefore, the Sit and Plant is a mobile, raised planting bed comprising a base portion and a removable shell liner insert. The base portion comprises a shell portion and removable supporting wheels. The removable shell liner insert comprises side walls conforming generally in length and configuration to the inner side walls of the base shell portion and having a bottom portion having a plurality of drainage holes distributed there through. The shell portion is adapted to receive the shell insert and to receive water draining therefrom, and to hold it therein. The shell portion is also provided with a controlled water drainage system, permitting the shell to be drained at the will of the user. While there are variations that may be made to the device of the present invention, it is to be understood that such changes are within the routine skill of the art, and are to be considered as part of the present invention.

What is claimed is:

1. A mobile, raised-planting bed comprising a base portion comprising supporting wheels, a shell portion, and a shell insert, said shell insert adapted to contain growing plants and comprising sides and an enclosing bottom, said sides sized and disposed to conform generally in size and disposition to the inner sides of said shell portion, and said enclosing bottom having a plurality of drainage holes distributed in the bottom thereof, said shell portion adapted to receive said shell insert and to receive water draining therefrom, and to hold it therein, and said shell portion also having a controlled water drainage system permitting said shell portion to be drained at the will of the user.

2. A mobile, raised planting bed in accordance with claim 1 in which said shell portion is additionally provided with grow light receptacles.

3. A mobile, raised planting bed in accordance with claim 1 in which said base portion is provided with four supporting wheels.

4. A mobile, raised planting bed in accordance with claim 3 wherein said wheels are provided with wheel locks.

5. A mobile, raised planting bed comprising a base portion comprising four supporting wheels, said wheels having wheel locks, a shell portion and a shell insert, said shell insert adapted to contain growing plants and comprising sides and an enclosing bottom, said sides sized and disposed to conform generally in size and disposition to the inner sides of said shell portion, and said enclosing bottom having a plurality of drainage hole openings distributed in the bottom thereof, said shell portion adapted to receive said shell insert and to receive water draining therefrom, and to hold it therein, said shell portion also having a controlled water drainage system permitting said shell portion to be drained at the will of the user, and provided with grow light receptacles.

* * * * *